United States Patent
Muller et al.

[11] Patent Number: 5,956,142
[45] Date of Patent: Sep. 21, 1999

[54] METHOD OF END POINT DETECTION USING A SINUSOIDAL INTERFERENCE SIGNAL FOR A WET ETCH PROCESS

[75] Inventors: K. Paul Muller, Wappingers Falls, N.Y.; Klaus Dieter Penner, Ottendorf-Okrilla, Germany

[73] Assignees: Siemens Aktiengesellschaft, Munich, Germany; International Business Machines Corporation, Armonk, N.Y.

[21] Appl. No.: 08/937,572

[22] Filed: Sep. 25, 1997

[51] Int. Cl.[6] .................................................. G01B 9/02
[52] U.S. Cl. .................................. 356/357; 250/559.28
[58] Field of Search .................................. 356/355, 357, 356/381, 382; 250/559.28; 216/85

[56] References Cited

U.S. PATENT DOCUMENTS

| | | |
|---|---|---|
| 4,367,044 | 1/1983 | Booth, Jr. et al. . |
| 4,454,001 | 6/1984 | Sternheim et al. . |
| 4,462,860 | 7/1984 | Szmanda . |
| 4,611,919 | 9/1986 | Brooks, Jr. et al. . |
| 4,680,084 | 7/1987 | Heimann et al. . |
| 4,838,694 | 6/1989 | Betz et al. . |
| 4,927,485 | 5/1990 | Cheng et al. . |
| 4,998,021 | 3/1991 | Mimasaka . |
| 5,405,488 | 4/1995 | Dimitrelis et al. . |
| 5,450,205 | 9/1995 | Sawin et al. . |
| 5,695,660 | 12/1997 | Litvak ...................................... 216/85 |

*Primary Examiner*—Samuel A. Turner
*Attorney, Agent, or Firm*—Stanton C. Braden

[57] ABSTRACT

A process for monitoring and determining the end point of a wet etch process for removing a thin solid film 116 from a substrate by directing a light beam onto the substrate and monitoring the intensity of reflected beams, including the step of selecting a coherence length of the incoming beam 120 so that it is small enough so that no interference occurs in the liquid layer and large enough so that interference can occur in the thin solid film, i.e., light reflected from the interface between the liquid 118 and the top of the thin film, and light reflected from the interface between the bottom of the thin solid film and the substrate interferes. If the liquid layer is about 100 micrometers thick, and the thin film is about 1 micrometer thick, a coherence length of about 10 micrometers is suitable. Such coherence length can be provided with a suitable bandpass filter.

10 Claims, 2 Drawing Sheets

METHOD OF END POINT DETECTION USING A SINUSOIDAL INTERFERENCE SIGNAL FOR A WET ETCH PROCESS

This invention relates to end point detection for an etch process. More particularly, this invention relates to end point detection for an etch process using a liquid etchant.

BACKGROUND OF THE INVENTION

Numerous methods of end point detection for etch processes are known. Many of them are based on laser interferometry or optical emission spectroscopy, which monitor the interference of light reflected from thin films as they are being etched, or the optical emission respectively. They use similar techniques, but different light sources. Laser interferometry uses a laser beam, such as a helium-neon laser, as a light source, whereas optical emission uses light from plasma emissions in a plasma reaction chamber as the light source.

A thin film interferometry approach is illustrated in FIG. 1. The incoming laser beam 11 is transparent to a thin film 12 which is to be etched. The light beam is reflected from the top surface of the thin film 12 and from the surface of the substrate 13. These reflected beams 14 and 15 respectively interfere. The thickness of the thin layer 12 is related to the wavelength ($\lambda$) of the laser beam 11 in accordance with the equation $$2d = N(\lambda/n) \quad (1)$$

wherein N is an integral and n is the refractive index of the thin film 12. For integral values of N (1, 2, 3 etc) the interference is constructive and the reflected intensity is a maximum; whereas for half integral values (N=1/2, 3/2, 5/2 etc) the reflected light interferes destructively and the intensity is at a minimum. During etching, a characteristic sinusoidal optical interference pattern of repetitive maxima and minima is monitored during etching. When the layer 12 is etched away, this pattern terminates, giving an end point signal.

FIG. 2 illustrates a typical pattern of the intensity of the reflected beam over time. The equation describing the intensity of a reflected beam modulated by interference due to a change in film thickness as it is being etched is $$\cos \frac{(4\pi n d_t)}{\lambda_o} = I \quad (2)$$

wherein I is intensity, n is the index of refraction of the film being etched, $d_t$ is the film thickness changing over time and $\lambda_o$ is the center of the wavelength of the incoming light beam in air or vacuum.

The etch rate is related to the change in time between the occurrence of two maxima, as shown in FIG. 3, and can be determined in accordance with equation 3:

$$ER = \frac{\lambda_o}{2n\Delta t} \quad (3)$$

The end point is reached when the intensity reaches a maximum and then remains unchanged, indicated at point EP in FIG. 3. Thus monitoring reflected light enables one to determine the etch rate and etch end point of a film on a substrate.

However, these known end point detection systems are useful for dry etching processes, e.g., plasma or reactive ion etching. If they are used for wet etch processes, they are required to ensure a constant thickness of the wet etchant in order to suppress unwanted interference effects.

An etch apparatus is available that accommodates a substrate having one or more thin films thereon to be wet etched to remove one or more of the films from one side only (frontside or backside) using known etch solutions. Such apparatus is employed to remove thin films from the one side of a substrate such as a silicon wafer, particularly from the back side, but also from the front side. A flow of wet etchant is supplied to that side of the wafer which faces up. By spinning the wafer, a film of wet etchant is formed whose thickness varies irregularly. Although the etch rate of particular etchants for particular films may be generally known, state-of-the-art semiconductor processing requires automated, in situ processing and very accurate end point detection also for this one side wet etch apparatus. Such a method does not presently exist for one side wet etch processes. Thus it would be highly desirable to be able to monitor etch processing using a one side etch apparatus and to determine the true end point.

SUMMARY OF THE INVENTION

We have found that a wet etch process can be monitored in situ and the end point detected by an optical process. A light beam of a preselected coherence length is directed toward the surface to be etched, which is covered with a liquid etchant. The liquid layer is generally much thicker than the thin film to be removed, and the wavelength of the incoming beam is chosen so that the liquid layer is essentially transparent, i.e., has a low absorption for the incoming light beam.

Although the incoming light beam will be partially reflected at the air-liquid film interface, at the liquid-solid film interface, and at the solid film-underlying substrate interface, the coherence length of the incoming beam is tailored so that it is large enough so that interference can occur in the solid layers but short enough so that little or no interference occurs in the liquid film. Only coherent light can show interference effects. Thus the present method can ignore the reflectance of light at the air-liquid interface since it is not modulated by interference effects. This is highly advantageous because the thickness of the liquid layer varies during processing, particularly when the substrate is rotated during etch processing. Thus anomalies in the reflected light due to changes in the thickness of the liquid layer can also be ignored.

The light beams reflected from the top and the bottom interfaces of the thin solid film to be etched will interfere. With changing film thickness, the intensity of reflected light goes through maxima and minima according to equation 2). The reflected light intensity is monitored in known manner while the solid film is being etched. The end point is reached when no further changes in the intensity occurs.

By employing a plurality of incoming light beams, and by monitoring several points on a substrate simultaneously, the etch rate and etch end points can be determined across the diameter of a substrate, or patterned and unpatterned areas of the substrate can be monitored.

DETAILED DESCRIPTION OF THE INVENTION

Figure 1:
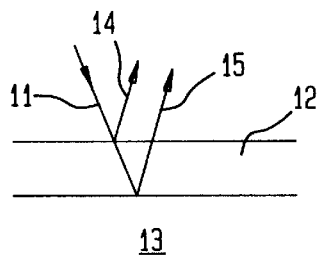
FIG. 1 is a cross sectional view of a thin film on a substrate showing an incoming light beam and the reflected beams.
Figure 2:
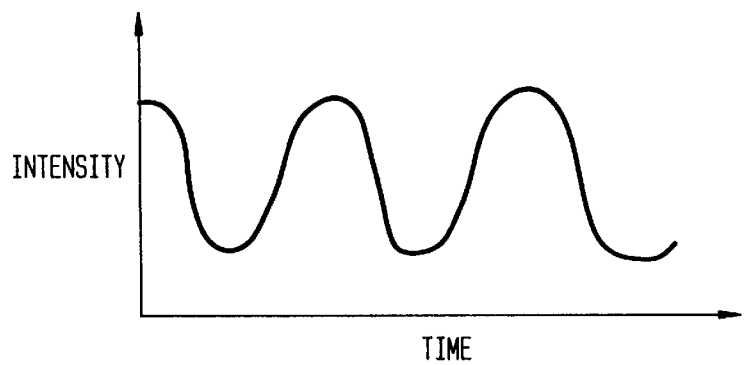
FIG. 2 is a graph of intensity versus time of a reflected light beam modified by interference, called the interference signal.
Figure 3:
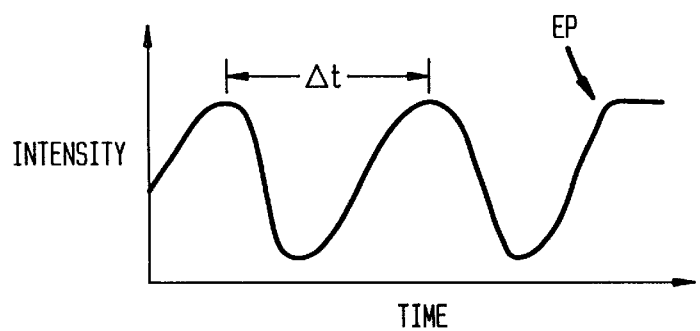
FIG. 3 is a graph of intensity versus time showing the endpoint and the correlation between etch rate and time between two maxima of an interference signal.
Figure 4:
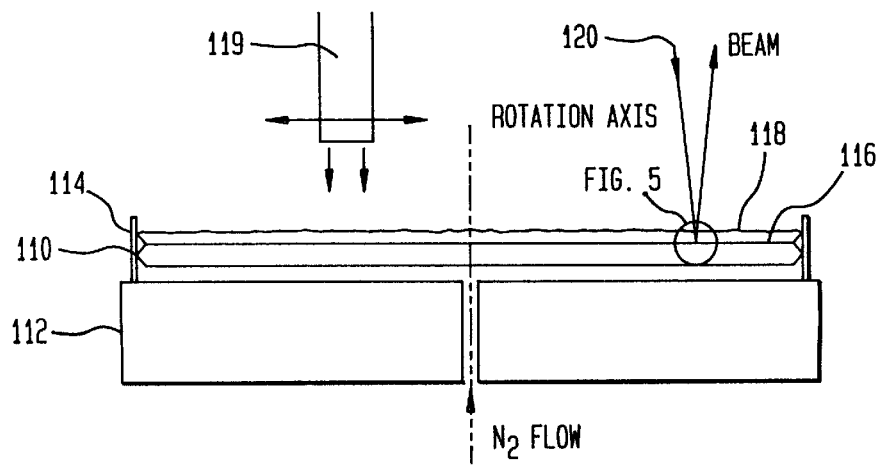
FIG. 4 is a partial schematic cross sectional view of a mounted substrate having a liquid etchant layer thereon to be monitored.

FIG. 4 illustrates a mounted substrate being monitored in an etch chamber (not shown) during a wet etch process. The substrate 110 can be a semiconductor substrate, for example a silicon wafer. The substrate 110 is mounted on a support 112, either front side down, or back side down, as shown. The support 112 has an extension 114 which maintains the substrate 110 in alignment with the support 112 and can be rotated by a motor (not shown). A flow of an inert gas such as nitrogen can pass through the support 112 to aid in sealing the substrate to the support and to maintain a thin protective gas film over the surface of the substrate (particularly the frontside of a silicon wafer having devices thereon) to prevent damage to the surface when processing the wafer. A thin solid film 116, which can be a film of a dielectric such as silicon nitride or silicon oxide, has a thickness of up to about 1 micrometer. A liquid etchant solution 118 for the thin film 116 can be applied, as with a nozzle 119, over the thin film 116. As shown, the liquid layer 118 is of variable thickness due to the rotation of the substrate 110 during etching, but is generally about 100 micrometers or more in thickness, or about two orders of magnitude thicker than the thin film 116 to be etched.

An incoming light beam 120 passes through the liquid layer 118 substantially without reflection until it impacts the top of the thin film 116.

Figure 5:
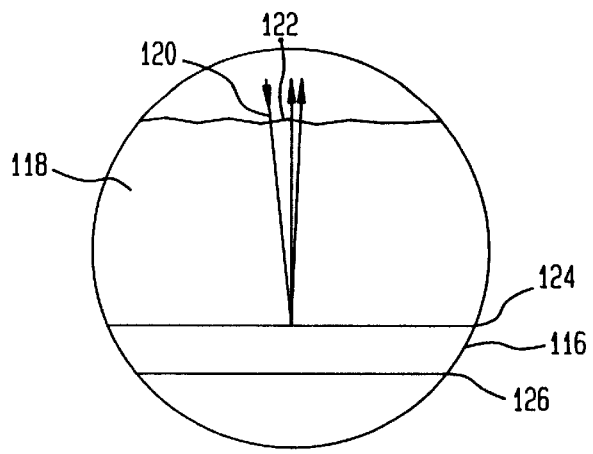
FIG. 5 is a detailed view of the circled area of the substrate of FIG. 4.

As shown in FIG. 5, which is a blown up view of the circled portion of FIG. 4, the incoming beam 120 is reflected both at the liquid-thin film interface 124 and the thin film-substrate interface 126, or at the top and bottom of the thin film layer 116. The reflected beams interfere and are monitored in known manner, as with a photodetector (not shown).

The coherence length of the incoming beam 120 is chosen so that it is large enough to generate interference effects when passing through the solid film, but short enough so that no interference occurs during its passage through the liquid layer 118, regardless of the thickness of the liquid layer 118 at any time or location. In general, the thickness of the liquid layer 118 varies with the rotation speed of the support 112.

As an example, if the thickness of the liquid layer 118 is about 100 micrometers, and the thickness of the thin solid film 116 to be etched is about 1 micrometer, a coherence length for the incoming light beam 120 of about 10 micrometers will be chosen.

Figure 6:
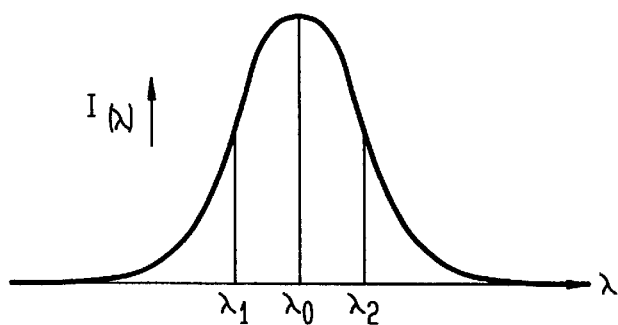
FIG. 6 is a graph of intensity of light versus wavelength of a narrow band spectral line.
Figure 7:
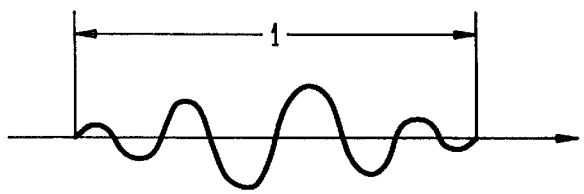
FIG. 7 is an illustration of intensity versus wavelength of a broad band light source.
Figure 8:
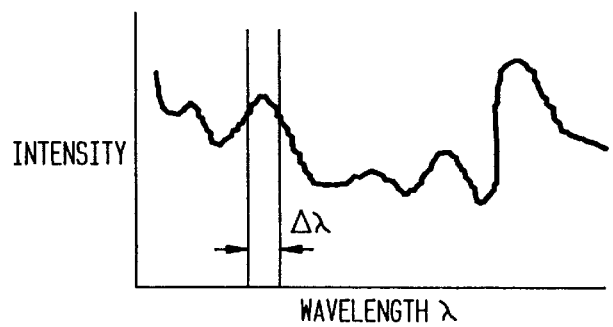
FIG. 8 $\Delta\lambda$ indicates a narrow band spectral line.

FIG. 6 illustrates the intensity ($\lambda$) of reflected light versus wavelength ($\lambda$) of a narrow band spectral line illustrating the band width with full width half maximum (FWHM) being $\lambda_2 - \lambda_1$ and $\lambda_o$ being the center wavelength. The correct center wavelength depends on the properties of the etchant and the solid film to be etched. Both need to be transparent at this wavelength. As an example, a green wavelength of 550 nanometers can be used when silicon oxide is to be etched with diluted HF.

The correct coherence length is determined as follows: at the wavelength ($\lambda_o$), the coherence length (L) is proportional to the inverse of the spectral bandwidth, $\Delta\lambda$, see equation 4.

$$L = \frac{1}{2\left(\frac{1}{\lambda_1} - \frac{1}{\lambda_0}\right)} = \frac{\lambda_1 \lambda_o}{2(\lambda_0 - \lambda_1)} \approx \frac{\lambda_o^2}{\Delta\lambda} \quad (4)$$

wherein L is the coherence length, $\Delta\lambda$ is the spectral bandwidth, $\lambda_1$ is the lower limit of wavelength and $\lambda_0$ is the peak wavelength. The coherence length L is chosen so that L is in between the film thickness of the solid film and the thickness of the liquid layer, e.g., 10 micrometers. That is accomplished by the proper choice of a band pass filter determining $\lambda_1$ and $\lambda_2$. The intensity of reflected light in a wavelength range between $\lambda_1$ and $\lambda_2$ is monitored over time to determine the etch rate and etch end point. Thus a wet etch process can be monitored in situ to provide accurate information about the progress of etching of a thin film on a substrate beneath a liquid etchant layer with varying layer thickness.

A Table of coherence length for various light sources is given below:

TABLE

| Light source | Coherence length |
| --- | --- |
| Mercury lamp | 0.6 micrometer |
| Spectral lamp | 0.3 meter |
| He/Ne laser | 3.0 meters |

Since none of the above light sources has the coherence length required for the present example (10 micrometers) the coherence length needs to be generated or tailored. Using an incoming beam of white light as the primary source of illumination, which has a spectral bandwidth that is too wide according to the present example, a bandpass filter that provides a preselected spectral bandwidth will be used to obtain the appropriate coherence length.

If the thickness of the solid film is about 1 micrometer and its index of refraction is 1.5, a coherence length of 3 micrometers or longer is required for passing light through the film and back and to ensure interference.

In cases where improved signal to noise is required, chopping and lock-in amplification can be used in known manner. If the signal chop is synchronized with the rotation speed of the substrate 110, or if more than one light source is provided, particular locations on the substrate 110 can be monitored. If two light sources are used, the light sources permit monitoring the center and the edge of the substrate simultaneously, which will enable one to monitor any differences in the etch rate across the substrate. If the chop is synchronized with the rotation, a specific location on the substrate, e.g., between two patterned areas, can be monitored.

Typically, the thin film 112 is a dielectric layer, such as silicon oxide deposited by chemical vapor deposition, as from tetraethoxysilane; or a doped silicon oxide such as borosilicate glass or borophosphosilicate glass. These materials can be wet etched with HF solutions, as is known. If the thin film is silicon nitride, an HF-glycerol mixture can be used as the etchant. If the thin film is polysilicon, a potassium hydroxide solution can be used as the etchant. The thin film 12 can be a layer of uniform thickness, or it can be patterned. When a patterned layer, e.g., a borosilicate glass mask, or a silicon oxide mask, is to be removed over a silicon nitride layer, the etchant solution must etch doped oxide or oxide selectively with respect to the silicon nitride layer. A determination of when the borosilicate glass layer has been removed can be made in accordance with the invention. If only a portion of a thin film is to be etched away, the film can be masked so that only certain portions of the thin film will be exposed to the wet etch solution.

The present invention can be used advantageously for single wafer processing in a one side wet etch apparatus, or can be used in bath type etches where the thickness of the liquid layer is variable.

Although the present invention has been explained in terms of specific embodiments, it will be understood by one skilled in the art that variations in the thickness and patterning of thin films, the spectral bandwidth and coherence length as well as wavelength can be made, and are meant to be included herein. The invention is only to be limited by the appended claims.

We claim:

1. A method of determining the end point of a wet etch process comprising providing a substrate having a thin film thereon to be etched in a one side wet etch apparatus fitted with a support for said substrate;

covering the surface of the film to be etched with an etchant solution of varying thickness;

selecting a coherence length for an incoming light beam having a length large enough so that interference will be present for the beams reflected from the interface between the liquid layer and the top of the thin solid film and from the interface between the bottom of the thin solid film and the substrate, and short enough so that no interference will be present for the beams reflected from the top surface of the liquid layer and the interface between the liquid layer and the top of the thin solid film;

providing a light beam having the selected coherence length that is directed onto the surface of the substrate; and monitoring the sinusoidal interference signal generated by the light beam at the thin film until the maxima remains unchanged, indicating the etch end point.

2. A method according to claim 1 wherein the substrate is rotated during etching.

3. A method according to claim 1 wherein the selected coherence length is obtained using a bandpass filter.

4. A method according to claim 1 wherein the thin solid film is about one micrometer thick.

5. A method according to claim 4 wherein the liquid layer is at least about 100 micrometers thick.

6. A method according to claim 1 wherein a chop and lock-in amplification of the reflected beams is carried out.

7. A method according to claim 6 wherein chopping is synchronized with the rotation speed of the substrate.

8. A method according to claim 1 wherein a plurality of light beams having a preselected coherence length are directed to the surface of the substrate.

9. A method according to claim 8 wherein a chop and lock-in amplification of the reflected beams is carried out.

10. A method according to claim 8 wherein chopping is synchronized with the rotation speed of the substrate.

* * * * *